March 23, 1926.
F. A. BOND
ANTISKID DEVICE
Filed March 24, 1924
1,577,684
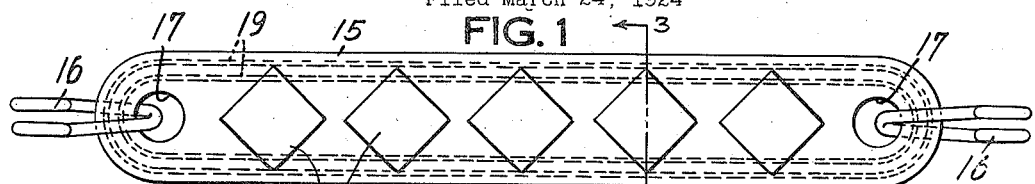
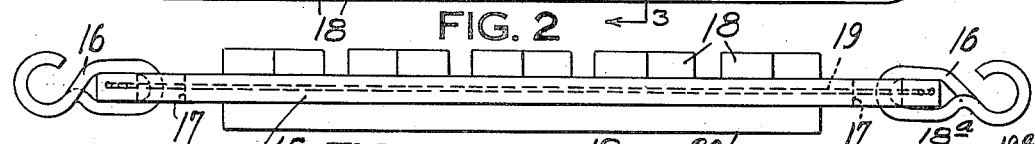
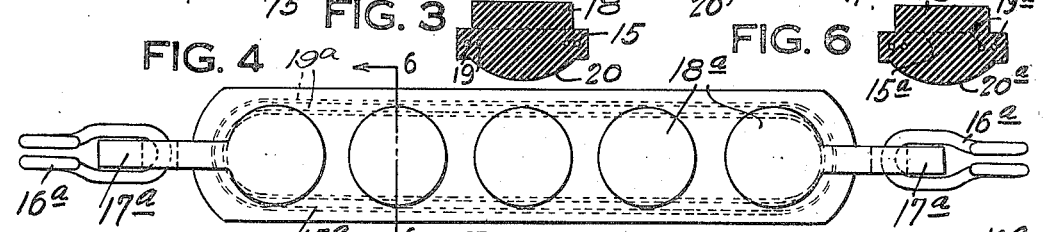
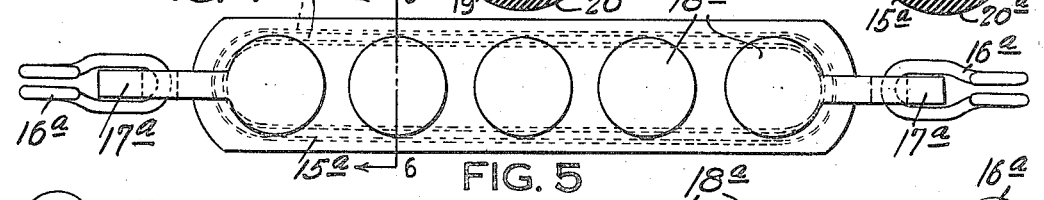
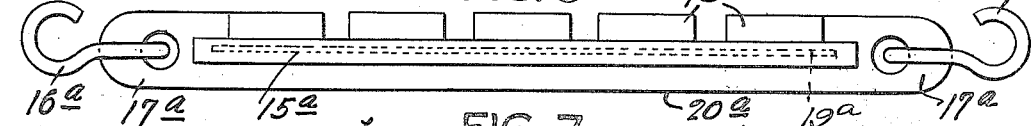
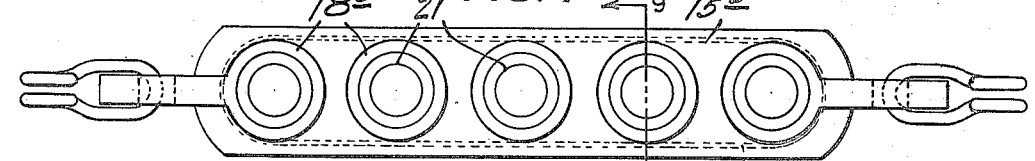
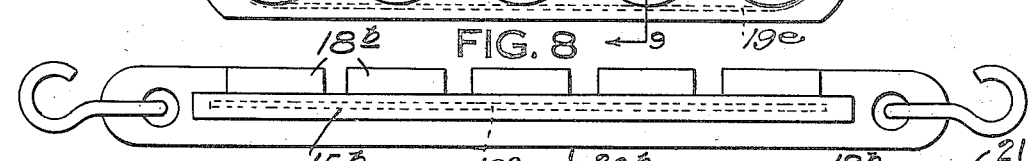
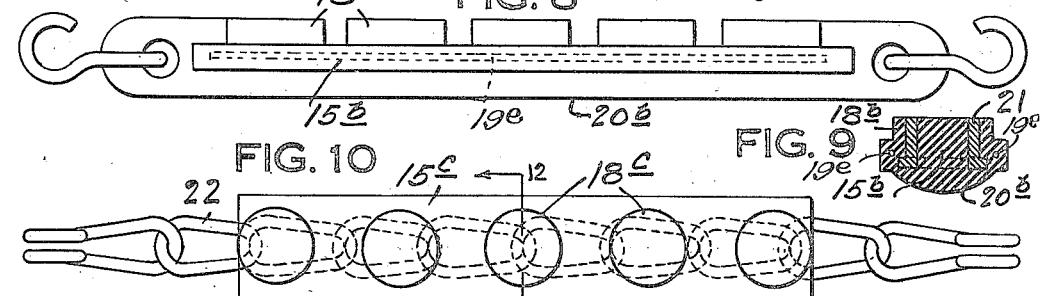
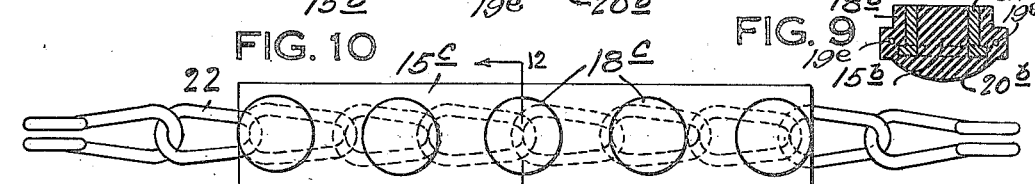
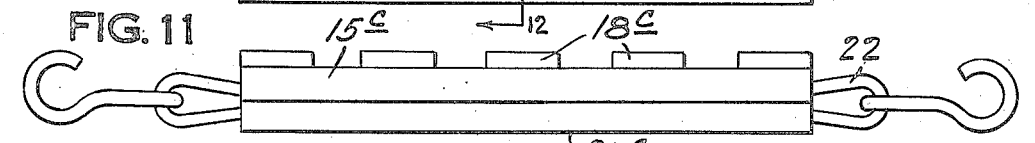
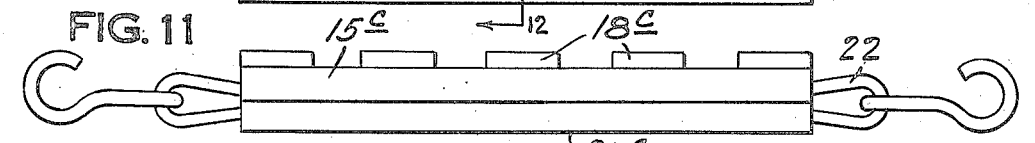
INVENTOR
Frank A. Bond
By Kay, Totten & Brown,
Attorneys Patented Mar. 23, 1926.

1,577,684

UNITED STATES PATENT OFFICE.

FRANK A. BOND, OF PITTSBURGH, PENNSYLVANIA, ASSIGNOR TO UNITED STATES CHAIN & FORGING COMPANY, OF PITTSBURGH, PENNSYLVANIA, A CORPORATION OF DELAWARE.

ANTISKID DEVICE.

Application filed March 24, 1924. Serial No. 701,483.

*To all whom it may concern:*

Be it known that I, FRANK A. BOND, a citizen of the United States, and resident of Pittsburgh, in the county of Allegheny and State of Pennsylvania, have invented a new and useful Improvement in Antiskid Devices; and I do hereby declare the following to be a full, clear, and exact description thereof.

My invention relates to anti-skid devices, and particularly to traction straps such as are employed in connection with the tire chains of automobiles.

One object of my invention is to provide a traction device that resists skidding, is not likely to damage the tire with which it is employed, one that is less noisy than the cross chains commonly employed in devices of this character, and having longer life than cross chains.

Another object of my device is to provide a traction strap or cross tie that is effective in its operation but which nevertheless does not seriously impair the easy riding qualities of the vehicle with which it is used.

Another object of my invention is to simplify and improve generally devices of this character.

My invention is particularly applicable for use in connection with pneumatic tires, but it will be apparent that it may be used with tires of other types.

Heretofore the most commonly used form of anti-skid member has consisted of annular side or tension chains disposed at the opposite sides of a wheel combined with cross chains that extend across the tread of the wheel and are connected at their opposite ends to the side chains, such for example, as in the Weed chain.

Other forms of anti-skid or cross chain devices have been employed but, where made of a form to provide proper gripping effect upon the road, have been of such thickness that a bump or shock is imparted to the vehicle when each cross member engages the roadway. Thin strips or bands have also been employed but owing to their thinness they have but short life; furthermore, they do not exert the necessary gripping action. Still another objectionable feature present in many of the substitutes for Weed chains arises from the difficulty of effecting a firm and simplified form of connection between the cross ties and the side chains or tension members.

Some of the forms which my invention may take are shown in the accompanying drawings wherein Figs. 1 and 2 are plan and side elevational views, respectively, of one form of traction strap embodying my invention; Fig. 3 is a cross sectional view taken on the line 3—3 of Fig. 1; Figs. 4 and 5 are plan and elevational views, respectively, of a slightly modified form of strap; Fig. 6 is a view taken on the line 6—6 of Fig. 4; Figs. 7 and 8 are plan and side elevational views, respectively, of a form of strap similar to that shown in Figs. 4 and 5, but provided with metallic inserts 21 in its tread; Fig. 9 is a sectional view taken on the line 9—9 of Fig. 7; Figs. 10 and 11 are, respectively, plan and elevational views of still another form of strap within which a chain is embedded and Fig. 12 is a view taken on the line 12—12 of Fig. 10.

Referring now to Fig. 1, the anti-skid strap comprises a molded rubber portion 15 adapted to lie across the tread of a tire in the manner of the usual cross chains, and metallic hooks 16 that are threaded through openings 17. The hooks 16 are adapted to engage with the usual side or tension chains (not shown) to hold the strap 15 in proper position across the tread of the wheel.

The strap member 15 has diamond shaped studs or pads 18 formed integrally therewith, upon its outer surface, for engaging the roadway and effectively resisting the skidding or slipping movements of the wheel to which the strap is applied.

Cords or wires 19 are embedded in the member 15 to give it greater strength and to also strengthen the eye portions 17 against being torn by the hooks 16 upon its inner or under side. The member 15 is curved, as shown more clearly at 20 in Fig. 3, so that it may roll slightly upon the tread of the wheel and permit the wearing face of the member 15 to more readily adapt itself to inequalities upon the surface of the roadway and to make effective engagement therewith.

Referring now to the form of device shown in Figs. 4, 5 and 6, I provide a construction differing from that of Fig. 1 mainly in the formation of the wearing pads 18ª and the eye portions 17ª; the former being round instead of angular and the latter being turned at right angles to the plane of the strap so that the hooks 16ª may be more easily inserted. In this structure I employ wires or cords 19ª that extend through the eye portion 17ª and through the body portion of the strap 15ª similar to the manner of the cords 19 shown in Fig. 1.

In the device of Figs. 7, 8 and 9 the strap member 15ᵇ is formed substantially in the same manner as the member 15ª of Figs. 4 and 5, but the studs 18ᵇ are provided with metallic inserts 21, as shown more clearly in Fig. 9. These metallic inserts 21 are placed in the mold when the tread 15ᵇ is being formed so that they may be securely positioned and held in place therein. In this form of device the tread has greater life because the inserts 21 do not wear so readily as the rubber but of course wear down simultaneously with the rubber. Furthermore, the edges of the inserts 21 tend to dig into the roadway, and are particularly effective when the vehicle is being driven over an icy surface. The bottom or inner ends of the inserts are covered by the lower curved surface 20ᵇ of the member 15 and protect the tire from bruises or abrasions that might result if the inserts were permitted to come into direct engagement with the tire. A strengthening wire 19ᵉ is embedded in the strap, as in the case of wire 19 of Fig. 1.

Referring now to Figs. 10, 11 and 12 I show a rubber tread or anti-skid member 15ᶜ in which is molded a cross chain 22 the outer ends of which are adapted to engage with and be supported by the usual side chains. The member 15ᶜ is provided with pads 18ᶜ and rounded bottom surface 20ᶜ corresponding to the members 18ª and 20ª of Figs. 5 and 6. The chain 22 is embedded within the tread 15ᶜ so that it does not come into engagement with the tire nor does it engage the roadway until the tread has become greatly worn. Even after the outer portion of the rubber strap 15ᶜ has worn down sufficiently to expose the chain 22 the device can still be used until the chain 22 wears through.

From the foregoing it will be seen that I provide an anti-skid device possessing not only the advantage of the usual forms with which automobiles are commonly equipped but one wherein there is a minimum danger of injury to the tire, one of easy riding qualities, noiseless, possessing long life, and which for these reasons, may be applied to a car in the autumn and permitted to remain upon the wheel until spring or until it is worn out, thus avoiding the necessity of frequent changes. Further, there are no links or metallic tie members exposed to wear and frequent breakage as in the case of cross chains.

Various changes in detail and general arrangement may be made without departing from the spirit and scope of the invention as defined in the accompanying claims.

What I claim is:

1. An anti-skid device comprising a strap member adapted to lie across the tread of a wheel, the said strap member being of flexible material with a tension device embedded therein and provided with openings adjacent to its ends for engagement with hook members.

2. An anti-skid device comprising a strap of flexible material having an eye portion adjacent to each end and inserts of relatively great tensile strength surrounding said eye portions.

3. An anti-skid device comprising a strap member adapted to lie across a tread of a wheel, the said strap member being provided with openings adjacent to its ends, and a tension device imbedded in said member and surrounding said openings, the said openings being adapted to receive hook members for attachment to said chains.

4. A traction strap for vehicle wheels comprising a member adapted to lie across the tread of a wheel and provided upon its inner side with a transversely curved surface and upon its outer side with a plurality of studs having flat road-engaging surfaces.

In testimony whereof I, the said FRANK A. BOND, have hereunto set my hand.

FRANK A. BOND.